Oct. 13, 1936.   W. L. WUEHR   2,057,075
INTERNAL COMBUSTION ENGINE
Filed April 4, 1934   2 Sheets-Sheet 1
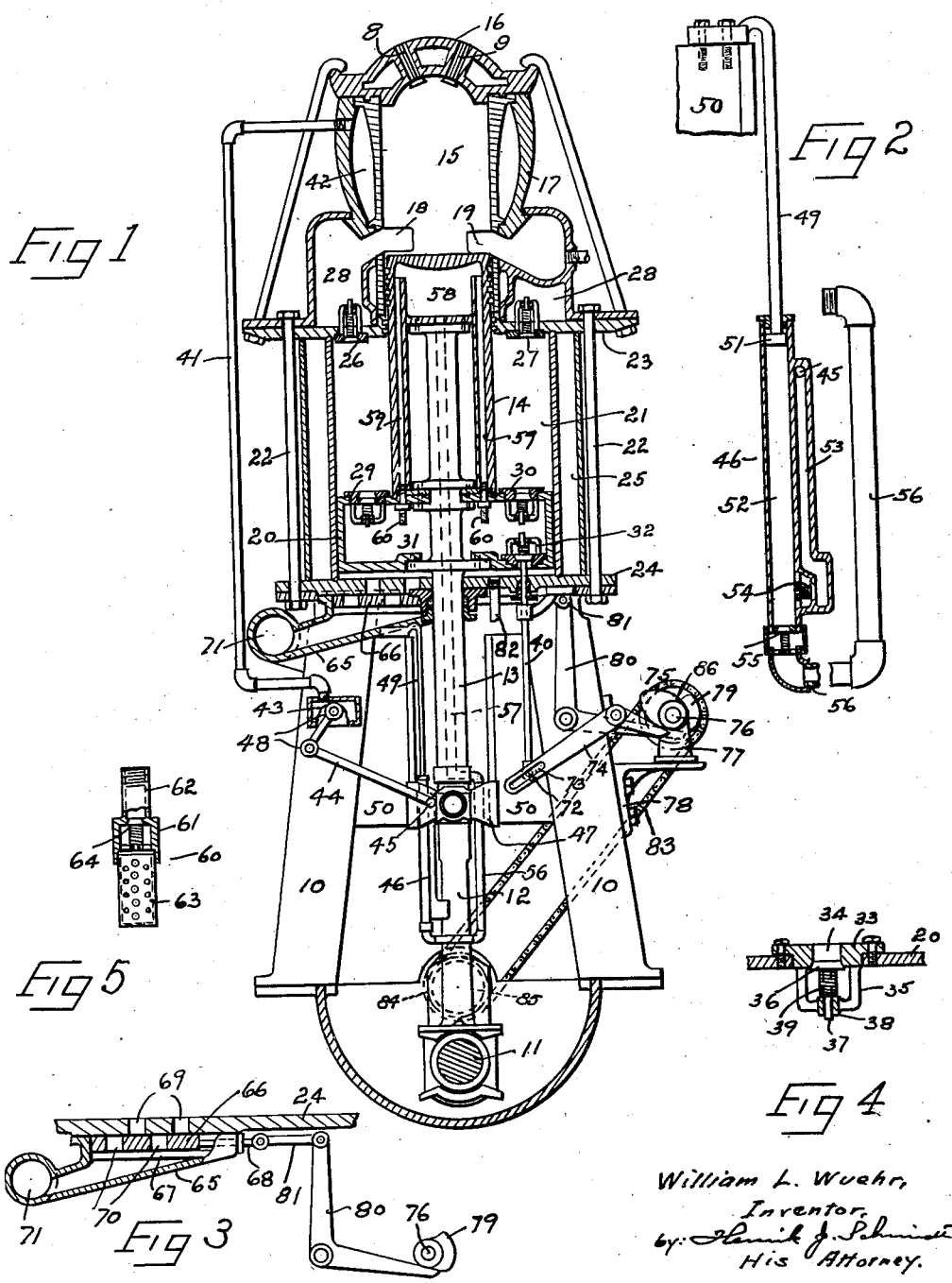
William L. Wuehr,
Inventor,
by Henrik J. Schmidt
His Attorney.

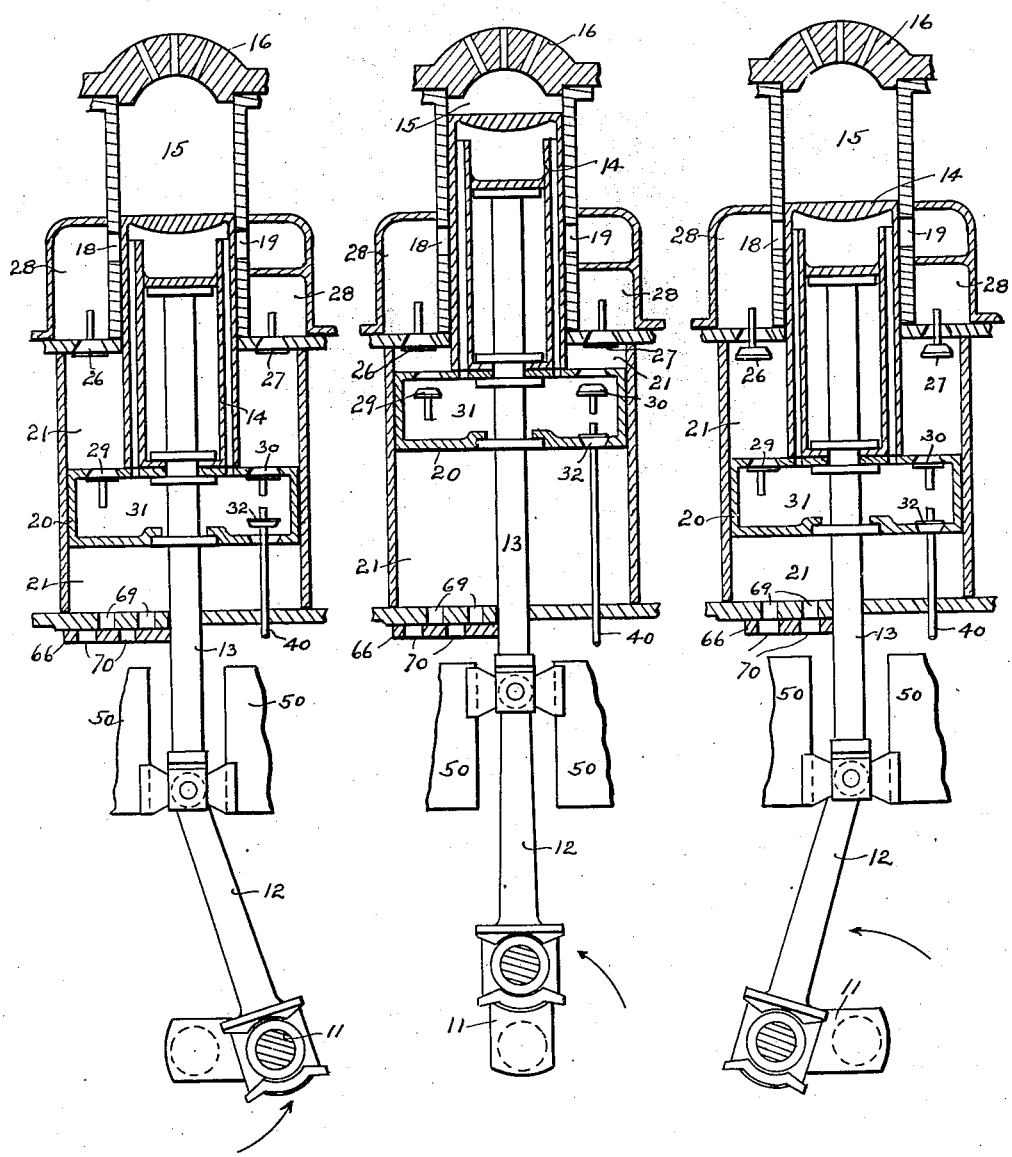

Patented Oct. 13, 1936

2,057,075

UNITED STATES PATENT OFFICE 2,057,075

INTERNAL COMBUSTION ENGINE

William L. Wuehr, Brooklyn, N. Y.

Application April 4, 1934, Serial No. 718,922

6 Claims. (Cl. 60—14)

The invention relates to internal combustion engines and more particularly to engines of the "Diesel" type. It has for its main objects to utilize the heat contained in the exhaust gases, so as to increase the efficiency of the engine by employing the energy contained in these gases to operate a secondary and oppositely-disposed piston, so that alternate power impulses will be delivered to the piston rod.

Another object is to employ the water used for cooling the engine in combination with the exhaust gases, so as to further increase the efficiency of the engine. A further object is to so construct the means employed that they may be used on engines of various types and timed to operate in proper relation to the standard parts of such engines. Additional objects are to so construct these means that they will not materially alter the ordinary standard parts of the engine nor interfere with the regular and customary operations of the engine.

These and various other objects and advantages will be readily understood from the following description and from the accompanying drawings of a preferred embodiment of the invention in which, however, modifications may be made without departing from the scope of the appended claims. In the drawings Fig. 1 is a cross-sectional side elevation of an engine to which the invention has been applied;

Fig. 2 is an enlarged, cross-sectional elevation of the cooling-water pump employed;

Fig. 3 is an enlarged, cross sectional view of the exhaust valve;

Figs. 4 and 5 are enlarged, cross-sectional views of other parts shown in Fig. 1; and Figs. 6, 7 and 8 are diagrams showing various positions of the cylinders during the rotation of the crank shaft.

To illustrate the invention a Diesel engine of the marine type has been selected and such an engine is shown on the drawings, however, it is not thereby meant to limit the invention to this or to any particular type of engine. Only such parts as are more or less directly connected with the present invention have been shown, so as to simplify the description.

The engine frame is shown at 10, the crank shaft at 11, the connecting rod at 12, the piston rod at 13, the regular piston at 14, the regular cylinder at 15, the cylinder head at 16, the water jacket at 17, the cylinder exhaust port at 18 and the scavenging port at 19. The air intake valve is shown at 8 and the fuel valve at 9.

The present invention resides in securing another larger and oppositely-disposed piston 20, to the lower end of the regular piston. This piston works in a cylinder 21 which is clamped, by means of tie-bolts 22, between an upper plate 23 and a lower plate 24. A jacket 25, is similarly clamped between these plates. Spring-actuated valves 26 and 27 lead from the exhaust chamber 28 to the upper part of the cylinder 21. These valves are secured on the upper plate 23. Spring-actuated valves 29 and 30 are secured on the upper face of the piston 20 and lead from the cylinder to an interior chamber 31 formed in the piston. Another spring-actuated valve 32 is secured in the lower end of this piston and leads from the chamber 31 to the lower end of the cylinder 21.

A detailed view of either valves 29 or 30 is shown at Fig. 4. The construction of the other valves is very similar to the construction of these valves. The valves are preferably made so that the whole valve structure may be removed or installed in one unit. Each valve consists of valve body 33 in which the valve seat 34 is provided and with which a spider 35 is formed integrally. The valve 36 is formed with a valve stem 37 which is supported in a bearing 38 formed on the spider, and a compression spring 39 holds the valve against the valve seat, so that the valve is normally closed. The valve 32 is also provided with an operating rod 40. The complete action of valve 32, as well as of the other valves, is described later.

A pipe 41 leads from the water space 42, in the jacket 17, to a small tank 43 which is suitably supported on the frame 10, while a pipe 44 leads from this tank to an intake opening 45 in the pump 46. This pump is secured to the cross-head 47 of the engine and reciprocates with the cross-head. The pipe 44 is provided with swivel joints 48 to enable it to move with the cross-head.

A piston rod 49 is secured to the upper end of one of the guides 50 between which cross-head works, and a piston 51 on the end of this rod engages in a cylinder 52. Water from the pipe 44 is fed to the cylinder 52, through the inlet 45 and a passage 53. A spring-actuated valve 54 is located at the lower end of this passage. Another valve 55 is located in the lower end of the cylinder and communicates with a pipe 56 which conveys the water to a passage 57 formed axially through the piston rod 13. The upper end of this passage terminates in a chamber 58 formed in the regular cylinder 14.

A plurality of passages 59 lead from the chamber 58 to the chamber 31 formed in the piston 20. Spray heads 60 are inserted in the lower ends of these passages. An enlarged view of one of these spray heads is shown in Fig. 5. The spray head consists of a body part 61 which has a threaded shank 62 insertable in one of the passages 59, and a perforated spray member 63 which extends into the chamber 31. A valve 64, is contained in the body member; its actions will be described later.

An exhaust valve, of the sliding type, is mounted under the plate 24. This valve and its operating mechanism are shown in detail in Fig. 3. It consists of a housing 65, in which a valve 66 is slidably mounted on rails 67. An operating rod 68 extends through the housing and is operated by a mechanism which will also be described later. A plurality of orifices 69 are formed in the plate 24 and similar orifices 70 are provided in the valve 66. The housing 65 terminates in an exhaust manifold 71.

The operation of the engine will now be explained. Inasmuch as all the valves in the cylinder heads, their operating mechanism, as well as all other operating gears of the engine, may be of standard make, all these parts have been omitted to simplify the drawings and the description.

Assume that the engine is running in either direction and that a fuel charge has just entered the regular cylinder 15. As the piston 14 descends the exhaust gases are liberated through the exhaust port 18 and flow into the chamber 28. The cylinder is next scavenged by air forced through the port 19. Part of this air mixes with the gases in the chamber 28. The valves 26 and 27 are so balanced that the pressure in the chamber 28 will cause them to open and allow the exhaust to enter the upper end of the cylinder 21.

As the piston 14 ascends, the valves 26 and 27 close and the gases in the upper end of the cylinder 21 are compressed until the pressure created overcomes the pressure of the springs in valves 29 and 30 and causes these valves to open. The exhaust gases now flow into the chamber 31 in the piston 20.

While this is taking place, water, which has absorbed heat while flowing through the cooling system of the cylinder 15, will flow through pipe 41 and into tank 43 from which it is conveyed, by pipe 44, passage 53, and the valve opening in valve 54, into the pump cylinder 52. As the pump cylinder ascends with the pistons, and as the piston rod 49 is stationary, it is evident that water from the pump cylinder is forcibly driven through valve 55, pipe 56, the axial passage 57 in the piston rod 13, and into the chamber 58 in the piston 14.

The water now flows through the passage 59 and through the spray heads 60. While passing through the chamber and the passages in the piston the water absorbs still more heat. This heated water is atomized, while flowing through the spray head, so as to thoroughly mix with the exhaust gases in the chamber 31.

The events just described are approximately timed as follows: The fuel intake in the cylinder 15 opens just a few degrees before the crank reaches top center and is closed at approximately 35 degrees after the crank has passed the top center. The air intake opens about 15 degrees after the crank has passed the top center and the complete opening and closing occupies about 100 degrees while the piston descends. The exhaust port 18 starts to open about 40 degrees before the crank reaches the bottom center and is closed when the crank has passed 40 degrees beyond the bottom center on the up stroke. About 10 degrees after the exhaust port 18 starts to open the scavenger port 19 opens and is closed about 10 degrees before the exhaust port is closed. While this takes place, or as soon as the piston starts to descend, the valve 66 is opened and stays open from the time the crank passes the top center and until it reaches the bottom center, at which time it closes. While the waste gases are thus exhausted from under the bottom of the piston 20, exhaust gases are drawn from the chamber 28 and into the space in the cylinder 21 above the piston 20.

As previously stated the valve 32 is actuatable by a rod 40. The lower end of this rod carries a stud 72 which engages in an elongated slot 73 formed in one end of a bell crank 74, which is actuated by a cam 75 secured on a shaft 76. This shaft is supported in bearings 77 which rest upon brackets 78, bolted to the frame 10. The shaft is rotated, in timed relation to the reciprocations of the pistons, through any suitable mechanism, as for example a chain 83 driven by a sprocket gear 84, secured on the crank shaft 85, and driving a sprocket gear 86, secured on the shaft 76.

When the pistons start to ascend the valve 32 is closed. As the pistons move upward the rod 40 lifts, or rotates, the bell crank 74 until the cam face on cam 75 engages with the short arm of the bell crank and, through the rod 40, opens the valve 32. This opening takes place shortly after the piston starts on the up stroke. The steam and gases now flow into the lower end of the cylinder 21, under the piston 20, where they expand and aid in forcing the pistons upwardly. Valve 32 is closed again by the time the crank is 60 degrees beyond the bottom center on the up stroke, so that the gases contained in the top of the cylinder 31 may again flow into the chamber 31 as pressure is exerted against the valves 29 and 30. These compressed gases remain in the chamber 31 until the pistons have again returned to the lower-most position and started on the up stroke.

As the pistons again start to descend the slide valve 66 opens to release the gases from the lower end of cylinder 21. This valve is actuated by a cam 79 which is also secured on the shaft 76. This cam rocks a bell-crank 80 which, through a link 81, is connected with the valve rod 68, as plainly shown in Fig. 3. When the orifices 69 and 70 are aligned the gases are exhausted through these openings and flow through the housing 65, into the exhaust manifold 71.

As the pistons again ascend the cycle just described is repeated. It is, of course, evident that the pressure obtained in the various parts of the cylinder 21 and in the chamber in the piston 20, as well as the expansion under this piston, depends on the manner in which the various automatic valves are balanced and in the manner in which the other valves are timed. By varying the balancing and timing of these valves, great variation in the pressures and the release of the pressures may be obtained. Figs. 6, 7 and 8 illustrate, diagrammatically, the actions of the various valves, through which the exhaust gases flow, during a complete cycle. The low-pressure piston is approximately twice the diameter of the high-pressure piston.

Having described my invention and its objects, what I claim as new and wish to protect by Letters Patent is:—

1. In combination with an internal combustion engine of the reciprocating piston type; a high pressure cylinder; a high pressure piston; an oppositely-disposed low pressure piston secured to the piston rod end of the high pressure piston; a chamber formed in said low pressure piston; a cylinder in which said low pressure piston operates; pressure-actuated valves for conveying the exhaust gases from the high pressure cylinder to the upper end of the low pressure cylinder; pressure actuated valves for conveying these gases through said chamber to the operating end of the low pressure cylinder to supply power to the low pressure piston; and means for exhausting the expanded gases from the low pressure cylinder.

2. In combination with an internal combustion engine of the reciprocating piston type; a high pressure cylinder; a high pressure piston; an oppositely-disposed low pressure piston secured to the piston rod end of the high pressure piston; a chamber formed in said low pressure piston; a cylinder in which said low pressure piston operates; pressure actuated valves for conveying the exhaust gases from the high pressure cylinder to the upper end of the low pressure cylinder; pressure actuated valves for conveying these gases through said chamber to the operating end of the low pressure cylinder to supply power to the low pressure piston; means for injecting water in a fine spray into the low pressure cylinder to mix with the gases; and means for exhausting the expanded gases from the low pressure cylinder.

3. In combination with an internal combustion engine of the reciprocating piston type having a water-cooling system; a high pressure cylinder; a high pressure piston, an oppositely-disposed low pressure piston secured to the piston rod end of the high pressure piston; a chamber formed in said low pressure piston; a cylinder in which said low pressure piston operates; pressure actuated valves for conveying the exhaust gases from the high pressure cylinder to the upper end of the low pressure cylinder; pressure actuated valves for conveying these gases through said chamber to the operating end of the low pressure cylinder to supply power to the low pressure piston; means for conveying water from the water-cooling system to the low pressure cylinder; means for injecting water in a fine spray into the low pressure cylinder to mix with the gases; and means for exhausting the expanded gases from the low pressure cylinder.

4. In combination with a water cooled engine of the reciprocating piston type; a high pressure cylinder; a high pressure piston; an oppositely-disposed low pressure piston secured to the piston-rod end of the high pressure piston; a chamber formed in said low pressure piston; a cylinder in which said low pressure piston operates; pressure actuated valves for conveying the exhaust gases from the high pressure cylinder to the upper end of the low pressure cylinder; pressure actuated valves for conveying these gases through said chamber to the operating end of the low pressure cylinder to supply power to the low pressure piston; means for forcibly conveying water from the cylinder cooling system through the piston-rod and into the low pressure cylinder; means for atomizing the cooling water before mixing it with the exhaust gases contained in the low pressure cylinder; and means for exhausting the gases from the low pressure cylinder.

5. In combination with a water cooled engine of the reciprocating piston type; a high pressure cylinder; a high pressure piston; an oppositely-disposed low pressure piston secured to the piston-rod end of the high pressure piston; a chamber formed in said low pressure piston; a cylinder in which said low pressure piston operates; pressure actuated valves for conveying the exhaust gases from the high pressure cylinder to the upper end of the low pressure cylinder; pressure actuated valves for conveying these gases through said chamber to the operating end of the low pressure cylinder to supply power to the low pressure piston; means for forcibly conveying water from the cylinder cooling system through the piston-rod and into the low pressure cylinder; means for atomizing the cooling water before mixing it with the exhaust gases contained in the low pressure cylinder; means for timing the admittance of the exhaust gases to the low pressure cylinder; and means for exhausting the gases from the low pressure cylinder.

6. In combination with a water cooled engine of the reciprocating piston type; a high pressure cylinder; a high pressure piston; an oppositely-disposed low pressure piston secured to the piston rod end of the high pressure piston; a chamber formed in said low pressure piston; a cylinder in which said low pressure piston operates; pressure actuated valves for conveying the exhaust gases from the high pressure cylinder to the upper end of the low pressure cylinder; pressure actuated valves for conveying these gases through said chamber to the operating end of the low pressure cylinder to supply power to the low pressure piston; means for forcibly conveying water from the cylinder cooling system through the piston rod and into the low pressure cylinder; a valve in the bottom of said chamber; means for atomizing the cooling water before mixing it with the exhaust gases contained in the low pressure cylinder; means for timing the admittance of the exhaust gases to the low pressure cylinder; means for timing the expansion of these gases; and means for exhausting the gases from the low pressure cylinder.

WILLIAM L. WUEHR.